(No Model.)
D. B. FRASER.
COFFEE ROASTER.
No. 587,090. Patented July 27, 1897.
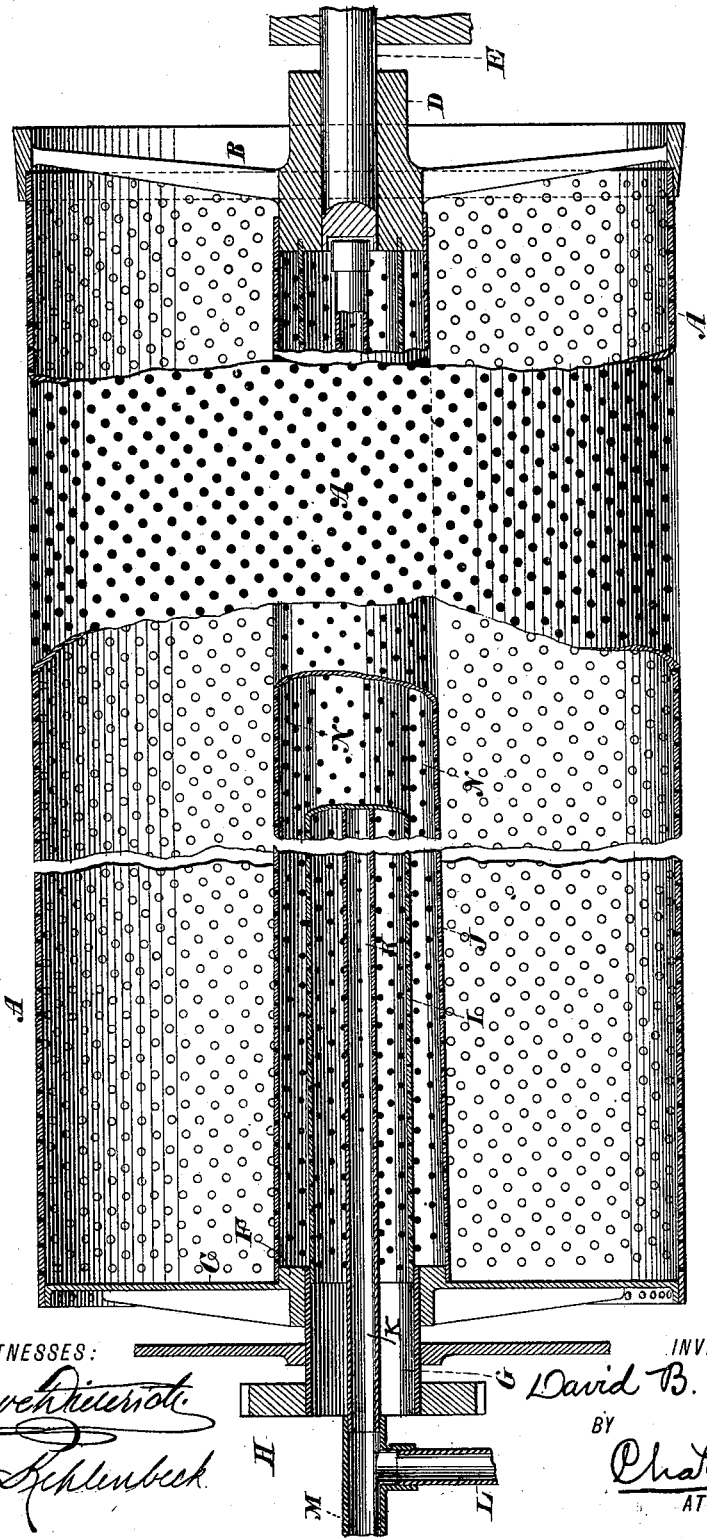
WITNESSES:
INVENTOR
David B. Fraser,
BY
Chas. C. Gill
ATTORNEY.

UNITED STATES PATENT OFFICE.

DAVID B. FRASER, OF NEW YORK, N. Y.

COFFEE-ROASTER.

SPECIFICATION forming part of Letters Patent No. 587,090, dated July 27, 1897.

Application filed December 14, 1896. Serial No. 615,543. (No model.)

*To all whom it may concern:*

Be it known that I, DAVID B. FRASER, a subject of Her Majesty the Queen of Great Britain, and a resident of New York, in the county of New York and State of New York, have invented certain new and useful Improvements in Coffee-Roasters, of which the following is a specification.

The invention relates to improvements in coffee-roasters and pertains particularly to the revoluble cylinder within which the coffee is roasted, said cylinder being adapted for any of the usual roasters.

In accordance with my invention the external perforated revoluble roasting-cylinder contains an inner central longitudinal perforated cylinder surrounding an elongated gas-burner or perforated gas-pipe and an intermediate perforated cylinder surrounding said inner cylinder, the three cylinders being connected to revolve together and to evenly and properly roast the coffee while the latter is moved within the space between the intermediate cylinder and outer cylinder.

The invention will be fully understood from the detailed description hereinafter presented, reference being had to the accompanying drawing, which illustrates in side elevation, partly broken away and partly in central vertical longitudinal section, a roasting-cylinder constructed in accordance with and embodying the invention.

In the drawing, A designates a usual perforated roasting-cylinder having the spider B at its front end and the cast head C at its rear end. The hub D of the spider B receives the shaft E, sustaining the front end of the cylinder A, and the hub F of the head C receives the hollow shaft G, to which power may be applied through a wheel H or other suitable means to revolve the cylinder A and its connected parts. The shafts E G will be mounted in the usual bearings, as heretofore.

Centrally within the cylinder A are the inner perforated cylinder I and intermediate perforated cylinder J, these cylinders being one within the other and secured at their ends to the hubs D F. The cylinders I J revolve with the external or main cylinder A, and the cylinder J will preferably, though not necessarily, be slightly cone-shaped, the larger end of the cone being adjacent to the head C.

Within the inner cylinder I is projected the stationary pipe K, which is connected with suitable pipes L M for supplying gas and air, respectively, under pressure, and said pipe K, constituting an elongated burner, is suitably perforated, as shown, and closed by a cap at its front end.

The inner cylinder I has its walls separated from the pipe or burner K, and the walls of the intermediate cylinder J are separated from the exterior surfaces of the cylinder I by the annular space N. The intermediate perforated cylinder J is a feature of special importance, and by reason of its use in the combination presented the coffee-beans will be uniformly and thoroughly roasted and all danger of the coffee being burned or unevenly treated avoided. The space N receives the heat escaping through the walls of the cylinder I, and this heat uniformly affects the cylinder J and is thoroughly diffused through the perforated walls of the same.

By means of my invention the coffee which is placed within the cylinder A for roasting may be subjected to a uniform temperature of proper degree and be thoroughly and evenly roasted.

What I claim as my invention, and desire to secure by Letters Patent, is—

The coffee-roasting cylinder A containing the inner perforated cylinder I and intermediate perforated cylinder J, combined with the elongated burner K within said cylinder I; substantially as and for the purposes set forth.

Signed at New York, in the county of New York and State of New York, this 12th day of December, A. D. 1896.

DAVID B. FRASER.

Witnesses:
CHAS. C. GILL,
E. JOS. BELKNAP.